United States Patent

Snoy et al.

[11] 3,894,446
[45] July 15, 1975

[54] POWER TRANSMISSION HAVING FRICTION CLUTCH BIAS DIFFERENTIAL WITH AUTOMATIC CLUTCH RELEASE

[75] Inventors: Joseph B. Snoy; Michael E. Gill, both of Rockford, Ill.

[73] Assignee: Twin Disc, Incorporated, Racine, Wis.

[22] Filed: June 3, 1974

[21] Appl. No.: 475,630

[52] U.S. Cl. ............... 74/711; 74/710.5; 192/103 F; 192/104 F; 180/44; 180/24.09
[51] Int. Cl. ..... F16h 1/44; F16d 43/28; B60k 17/34
[58] Field of Search .......... 74/711, 710.5; 180/44 R, 180/44 E, 44 F, 24.09; 192/103 F, 104 F

[56] References Cited
UNITED STATES PATENTS

| | | | |
|---|---|---|---|
| 3,324,983 | 6/1967 | Snoy et al. | 192/104 F X |
| 3,390,594 | 7/1968 | Gillespie | 192/104 F X |
| 3,461,993 | 8/1969 | Brundage | 192/104 F X |
| 3,537,557 | 11/1970 | Olson | 192/104 F X |
| 3,642,103 | 2/1972 | Schott | 74/710.5 X |

*Primary Examiner*—Samuel Scott
*Assistant Examiner*—P. S. Lall
*Attorney, Agent, or Firm*—James E. Nilles

[57] ABSTRACT

A power transmission for an all-wheel drive earth moving truck of the off-highway type. More specifically, an inter-axle friction clutch biased differential with automatic clutch release for such a power transmission. The differential is equipped with a clutch which provides a predetermined amount of torque differential, or bias, between the two shafts that drive the front and rear wheels, for thereby accommodating slipping conditions. The amount of differential or bias torque is determined by the load capability of the drive train which is located downstream of the differential. The clutch serves to protect the drive train from excessive loads in that, when the predetermined torque value is attained, the friction clutch will slip. Thus means are provided for sensing the slip of the friction clutch and for completely releasing the clutch before high speed slip values of the clutch are developed. Otherwise continuous slip of the clutch at high speed slip values and rated torque would cause failure of the clutch.

4 Claims, 10 Drawing Figures

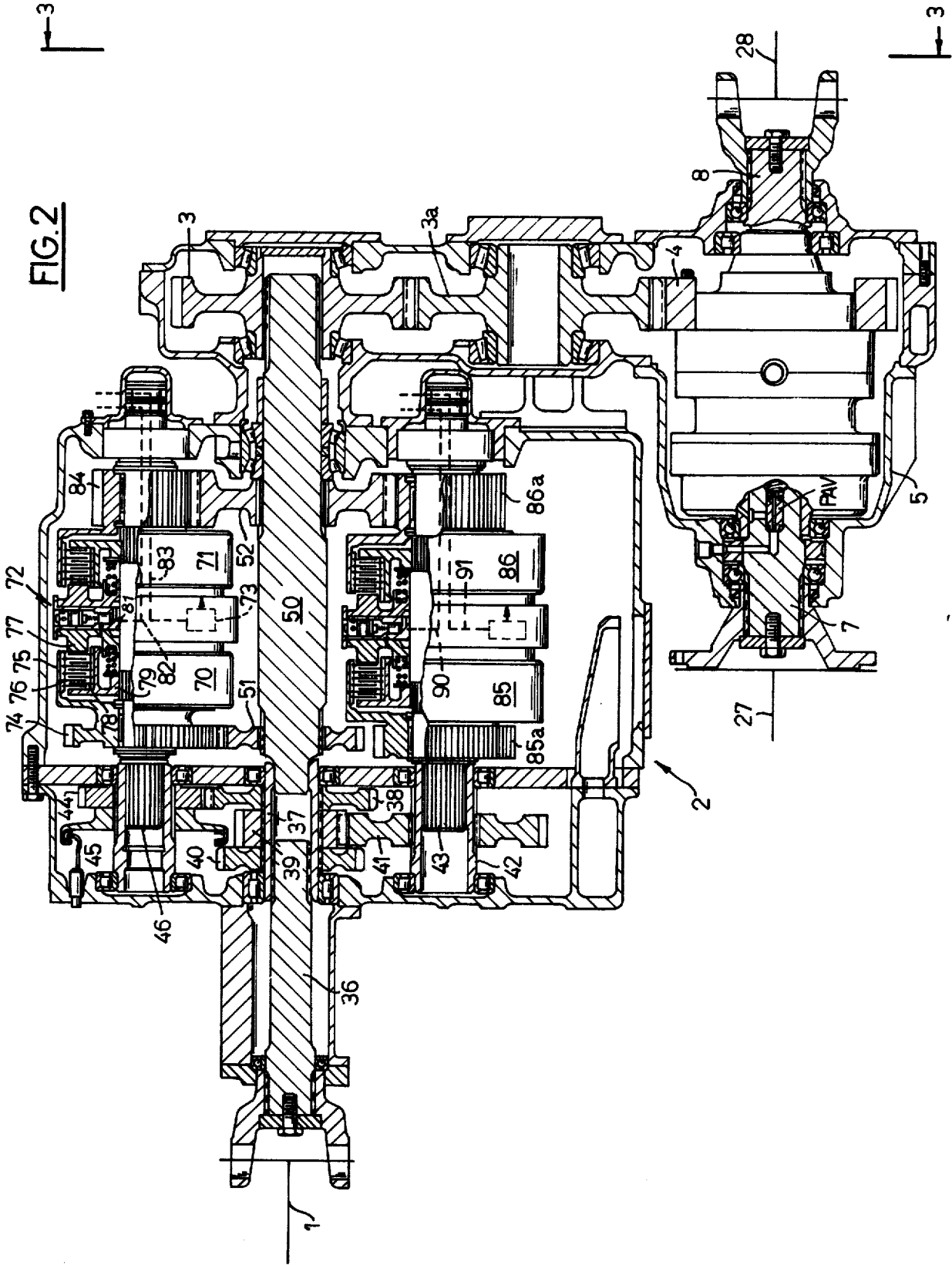

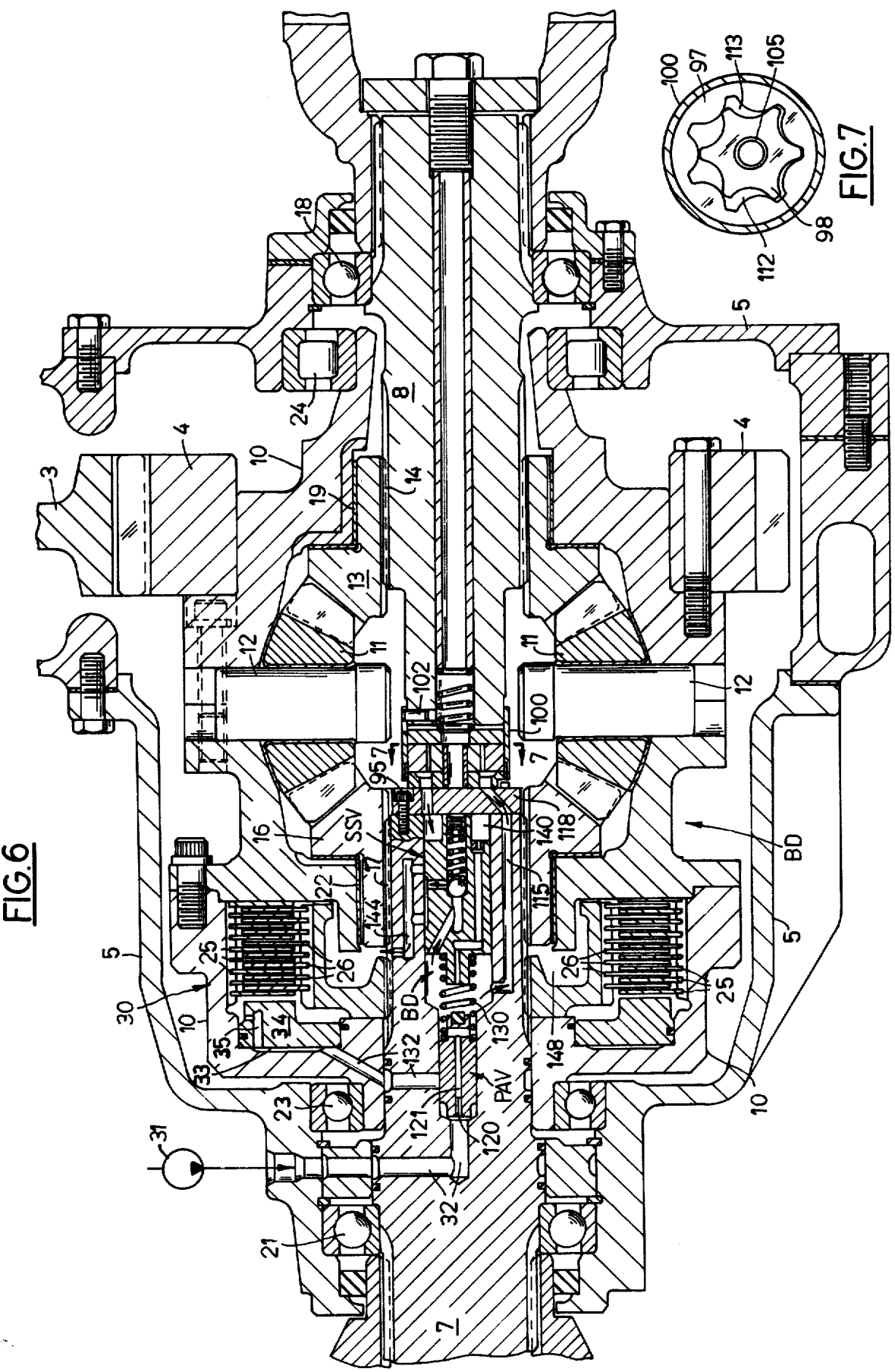

POWER TRANSMISSION HAVING FRICTION CLUTCH BIAS DIFFERENTIAL WITH AUTOMATIC CLUTCH RELEASE

SUMMARY OF THE INVENTION

The present invention provides a power transmission for a vehicle in which both the front and rear wheels are driven and more particularly, provides an inter-axle differential for the front and rear axles. The differential is equipped with a slippable friction clutch that provides a predetermined amount of torque differential or torque bias between the two outputs of the differential, for accommodating slipping conditions. The amount of the torque bias is determined by the load capability of the drive train which is located downstream of the differential and the clutch serves to protect the drive train from excessive loads, that is when the predetermined torque value is attained, the clutch will slip. The invention provides a means for sensing the slipping of the friction clutch and which will completely release the friction clutch prior to the attaining of high slip speed values.

The present invention thus provides an inter-axle differential for an all-wheel drive earth moving truck or the like and which recognizes rotational speed differences between the two drive axles and as a result releases the friction clutch when a predetermined torque value develops, thereby preventing continuous slip of the clutch at high slip speed values and rated torque, which would otherwise cause failure of the clutch.

These and other objects and advantages of the present invention will appear hereinafter as this disclosure progresses, reference being made to the accompanying drawings.

BRIEF DESCRIPTION OF THE DRAWINGS

FIG. 2 is a cross-sectional view, on an enlarged scale of the change gear and differential transmission shown in FIG. 1;

FIG. 6 is a longitudinal cross sectional view through the transfer case which houses the inter-axle, biased differential as shown in FIG. 1, but on an enlarged scale, certain parts being shown as broken away for the sake of clarity, and furthermore showing the system in normal operation, for example, where a pressure of approximately ten pounds per square inch is being directed to the system;

FIG. 7 is a sectional view taken along line 7—7 in FIG. 6, but on an enlarged scale;

DESCRIPTION OF A PREFERRED EMBODIMENT

Figure 1:
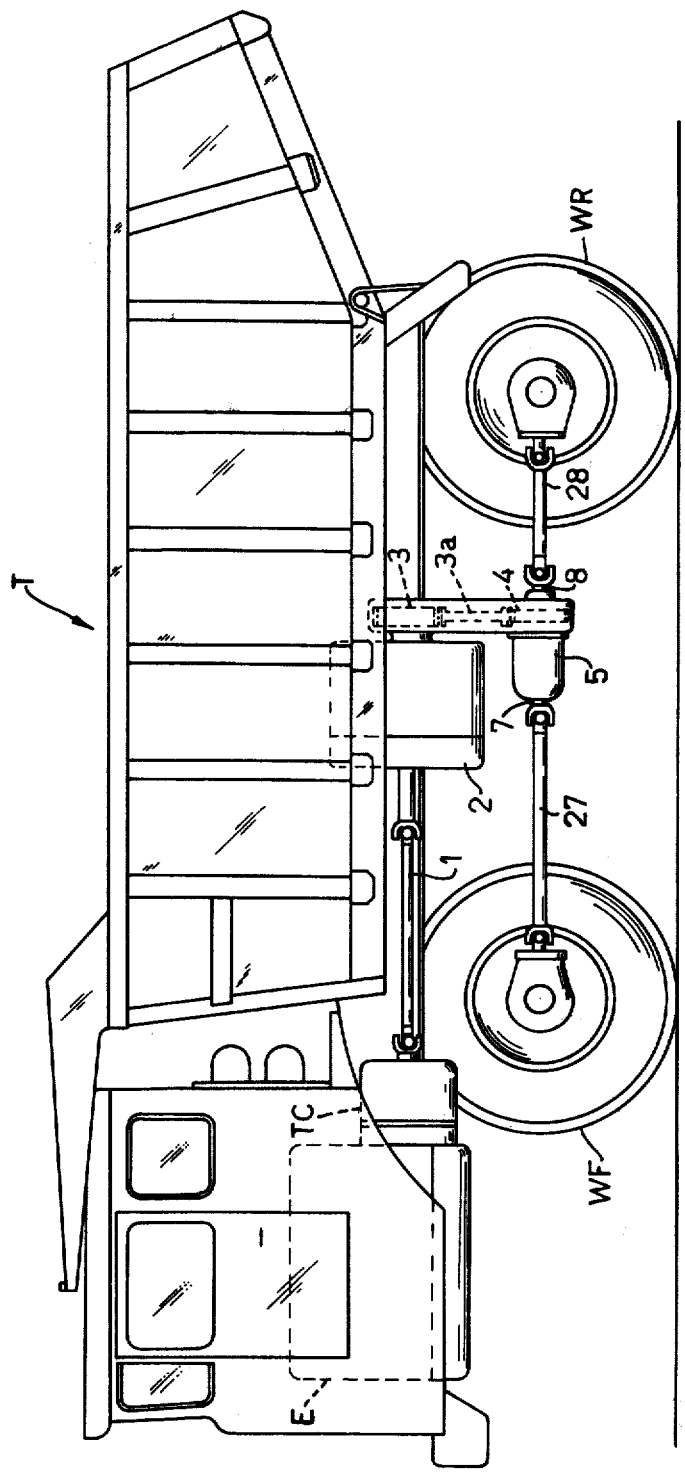
FIG. 1 is a side elevational view of an all-wheel drive earth moving truck of the off-highway type and which embodies the present invention.

The general organization of the power transmission made in accordance with the present invention is shown in FIG. 1 as being applied to a heavy duty, off-highway earth moving truck T in which both the front wheels WF and the rear wheels WR are power driven. Power is supplied, for example, from an internal combustion engine E, which delivers power to an attached torque converter TC which in turn then delivers the power through an output shaft 1 and into a change gear transmission 2. Power is transmitted out of the change gear transmission 2 through constant mesh gears 3 and 3a and through gear 4 of the differential BD located in a transfer case 5.

The transfer case 5 houses the biased differential BD, the differential furnishing power out through both a front output shaft 7 and a rear output shaft 8 to the front and rear wheels, as will appear.

More specifically, the gear 4 (FIGS. 1, 2 and 6) is rigidly fixed to and rotatable with a pinion carrier 10 (FIG. 6) which carries a series of bevelled pinions 11 that are rotatably mounted on their stub shafts 12 fixed within the rotatable carrier 10. The bevelled pinions 11 are in constant mesh with a bevelled gear 13 which is fixed by spline means 14 to the rear output shaft 8. The bevelled pinions 11 are also in constant mesh with a bevelled gear 16 which is splined at 17 to the front output shaft 7.

Shaft 8 is journalled in the transfer case 5 by anti-friction bearing assembly 18 and also by the gear 13 journalled in the sleeve bearing 19 in the carrier 10. Shaft 7 is journalled in anti-friction bearing assembly 21 in the casing 5 and also by the bevel gear 16 journalled in sleeve bearing 22. The carrier 10 is journalled in the casing 5 by anti-friction bearing assemblies 23 and 24.

A disc type, friction clutch 30 is interposed between the carrier 10 and the shaft 7 so that a releasable connection is provided between the carrier 10 and the shaft 7 through their respective interleaved friction clutch plates 25 and 26. Fluid control means, later described, are provided for actuating the clutch 30, by controlling the flow of clutch apply fluid pressure from a pressure source, such as a fluid pump 31, through passage means 32 and to the piston actuating chamber 33. Pressurization of chamber 33 causes the clutch piston 34 to engage or compress the stack of friction clutch plates 25 and 26, in the known manner.

An orificed vent 35 in the piston 34 bleeds fluid from the apply chamber 33.

With the above general arrangement, when the clutch 30 is engaged, the shafts 7 and 8 are both driven by the differential, bevel gears, and power is furnished to the front wheels WF through shaft 7 and the front power shafts 27 while power is also transmitted through shaft 8 and through the rear power shaft 28 into the rear wheels WR.

CHANGE SPEED TRANSMISSION

The change speed transmission 2, shown clearly in FIG. 2, employs a series of hydraulically actuated friction clutches for changing speed and direction of the output gear 3 by selectively engaging various gear combinations associated with these clutches. If a complete description of the various detailed parts of this change speed gear transmission is deemed to be either necessary or desirable, reference may be had to two patents assigned to an assignee common with the present application; namely U.S. Pat. No. 3,534,840 issued Oct. 2, 1970 and U.S. Pat. No. 3,651,904 issued Mar. 28, 1972.

It is deemed sufficient to say for purposes of this disclosure, therefore, that power is transmitted from shaft 1 to the input shaft 36 and through the splined sleeve 37 and to gears 38, 39 and 40 fixed on sleeve 37. Gear 39 is in constant mesh with a gear 41 which is splined to the sleeve 42. Sleeve 42 has an internal spline by means of which it is connected to and for driving shaft 43. The other gear 38 is in constant mesh with a gear 44 which is splined to sleeve 45 which in turn is internally splined to a shaft 46. All of the shafts are suitably journalled in anti-friction bearings within the housing 49 of the change gear transmission in the known manner.

An output shaft 50 is rotatably journalled in the change speed transmission housing and has gears 51, 52 and the output gear 3 splined thereto and for rotation therewith.

Figure 4:
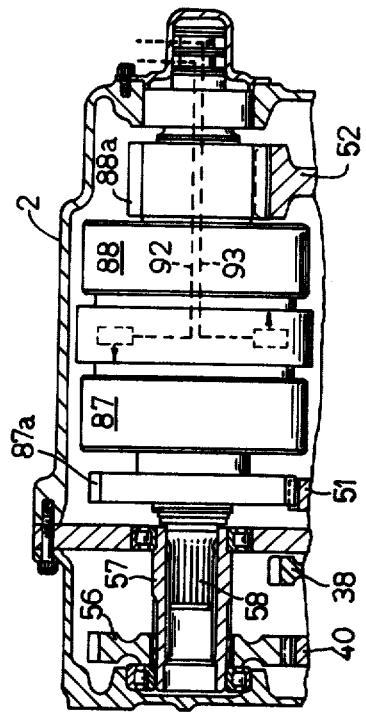
FIG. 4 is generally a sectional view of the fourth and second clutches, the view being taken along line 4—4 in FIG. 3.

As shown in FIG. 4, gear 40 is in constant mesh with a gear 56 which is splined to sleeve 57 and which in turn is internally splined to shaft 58.

Figure 5:
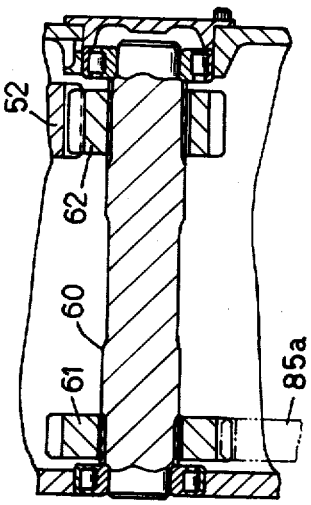
FIG. 5 is a view of the lay shaft 20, the view being taken along line 5—5 in FIG. 3, but on an enlarged scale.
Figure 3:
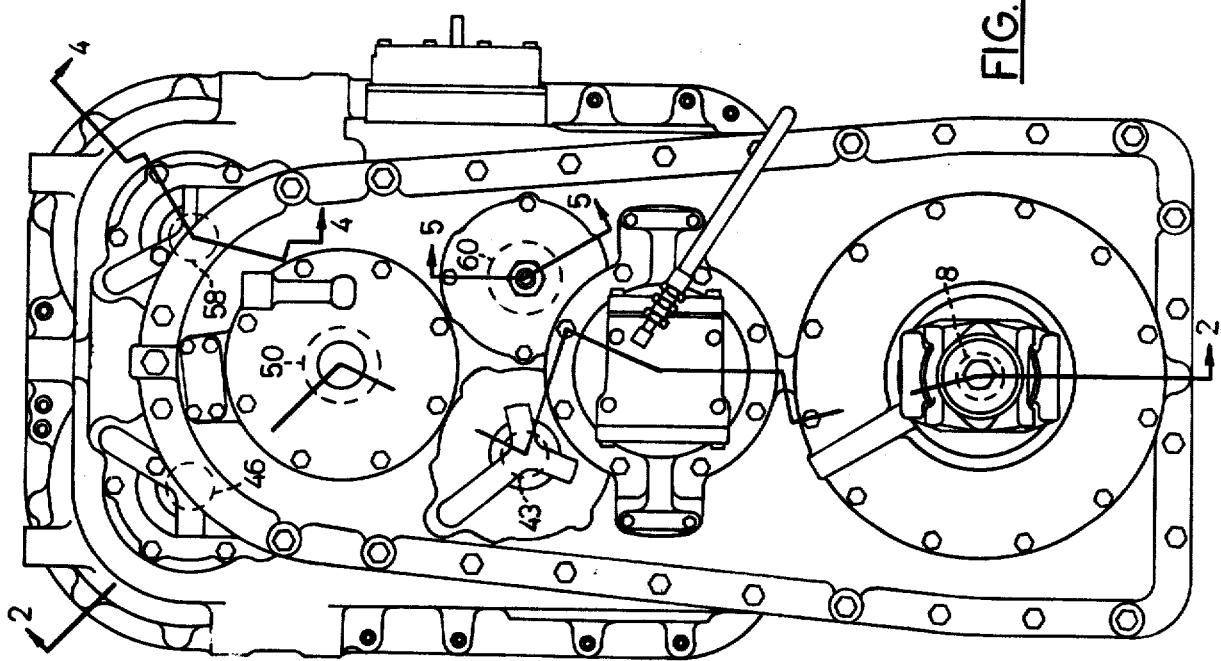
FIG. 3 is an end, elevational view of the change speed gear transmission, the view being taken along line 3—3 in FIG. 2.

As shown in FIG. 5, a layshaft 60 is journalled in the housing and has gears 61 and 62 splined thereto for rotation therewith and which mesh with gears 85a and 52, respectively.

In the above arrangement, as long as shaft 36 is rotating, gears 38–41, 44 and 56 are also rotating.

Shaft 46 has a dual clutch pack associated therewith as shown in FIG. 2, and the clutch pack includes a fifth gear-hydraulically actuated clutch 70, a third gear-hydraulically actuated clutch 71, and two valve mechanisms 72 and 73 for actuating, respectively, the clutches 70 or 71. Furthermore, a gear 74 is in constant mesh with gear 51 and is fixed with the clutch drum 75 which has interleaved clutch plates associated therewith in the known manner. In regard to clutch 70, a piston 77 acts to compress or engage the clutch plates 76 of the drum 75 and the interleaved clutch plates 78 splined to the hub 79, which hub in turn is splined to shaft 46. The piston 77 can be actuated by pressure fluid which enters an annular groove 81 and passes through the rifle drilling 82 to the valve mechanism 72, all as taught in the said patents. It is believed sufficient to say that this fluid pressure can be selectively directed via passages 82 or 83 to either of the pistons of the clutches 70, 71, to thereby engage either clutch and consequently cause rotation of their respective gears 74 or 84.

The construction of the reverse clutch 85, the first gear clutch 86, the fourth gear clutch 87 (FIG. 4), and the second gear clutch 88 are all similar to the above described arrangement and as fully disclosed in said patents. The clutches 85, 86, 87 and 88 also have their respective gears 85a, 86a, 87a and 88a all connected to their respective clutch drums, as described in connection with clutch 70. They also have the piston actuating valve arrangements as described in connection with clutches 70 and 71 and it is believed sufficient to say that clutch apply fluid pressure is supplied to the valve of clutches 85 and 86 via passages 90 and 91 while clutch apply pressure is supplied to the valve of clutches 87 and 88 via the pressure lines 92 and 93. The speed and rotational direction of the gear 3 can thus be varied, as consequently can the shafts 27 and 28 which are driven through the biased differential BD to be described hereafter in detail.

A more detailed description of the clutch packs and their operation is deemed to be neither necessary nor desirable as far as the present disclosure is concerned.

PRESSURE FLUID CONTROL MEANS

Referring now in greater detail to FIGS. 6 through 10, pressure fluid control means are provided for regulating the pressure fluid to the main clutch 30. More specifically, the amount of clutch engagement, that is the amount of slipping of the clutch 30 and the disengagement of clutch 30, is determined by relative rotation between the front and rear wheels of the truck T and more specifically, by the rotational speed difference between shafts 7 and 8 of the biased differential BD.

A reversible fluid pump P is provided between the shafts 7 and 8, the pump having one part which is driven by shaft 7 and another part driven by shaft 8. When these two parts are rotated at different speeds, a pumping action occurs to permit disengagement of the clutch 30. On the other hand, as long as the two shafts 7 and 8 are rotating at the same speed, no pumping action by pump P occurs and the clutch 30 remains engaged. The direction of flow of pressure fluid to the pump is always as indicated by the arrow in passage 115 and the direction of flow from the pump is always as indicated by the arrow in passage 117 in the ported member 118.

Thus, fluid is pumped whenever there is differential motion between output shafts 7 and 8. Regardless of the direction of rotation of the shafts 7 and 8, the pump always pumping in and out of the same ports.

More specifically, porting member 118 is fixed to shaft 7 by cap screws 95 for rotation therewith while the concentrically arranged pumping gear 97, the spring loaded pressure plate 99, and connecting collar 100 are connected to shaft 8 by a pin 102 engaging a slot 103 in collar 100. The eccentrically arranged pumping gear 98 is fixed to a valve plate 104 by a shaft 105. Plate 104 and gear 98 can oscillate relative to porting plate 118 within limits as defined by a pin 107 extending from plate 118 which engages in the slot 109 (FIGS. 9 and 10) in valve member 104. Valve member 104 has kidney-shaped ports 110 and 111 which are registerable with the outlet side 112 (FIG. 7) and inlet side 113 of the pump that are formed between the pumping gears 97 and 98. Ports 110 and 111 are also registerable with passages 116 and 117 of plate 118 when there is differential rotation between shafts 7 and 8.

The fluid control means provided by the present invention will now be described and provides means for sensing slip of the clutch 30 and acts to completely release the clutch 30 before high values of speed are achieved.

The control system includes a fluid pressure supply valve PAV which has an orifice 120 and a central passage means 121 extending therethrough and which places the left end of the valve PAV in communication with the right end (as viewed in the drawings). A flexible plug 122 is secured to the right end of the valve for a purpose that will appear. The valve PAV is axially shiftable and either permits fluid pressure from the pressure source 31 and passage 32 to flow to the clutch actuating chamber 33 or the valve PAV prevents fluid pressure from entering chamber 33, as shown respectively in FIGS. 8 and 9.

Figure 9:
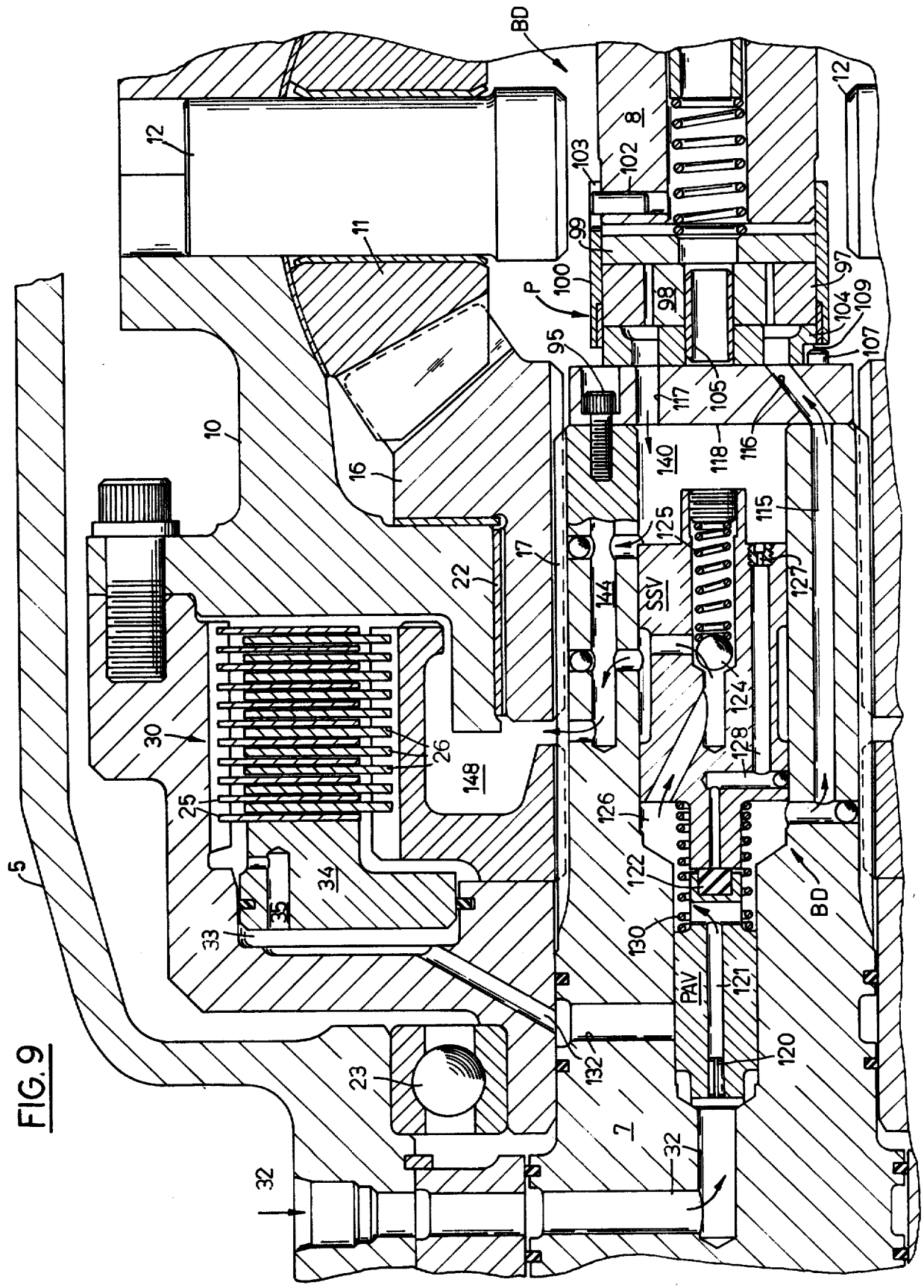
FIG. 9 is a view similar to FIG. 8, but showing a clutch slipping position.
Figure 10:
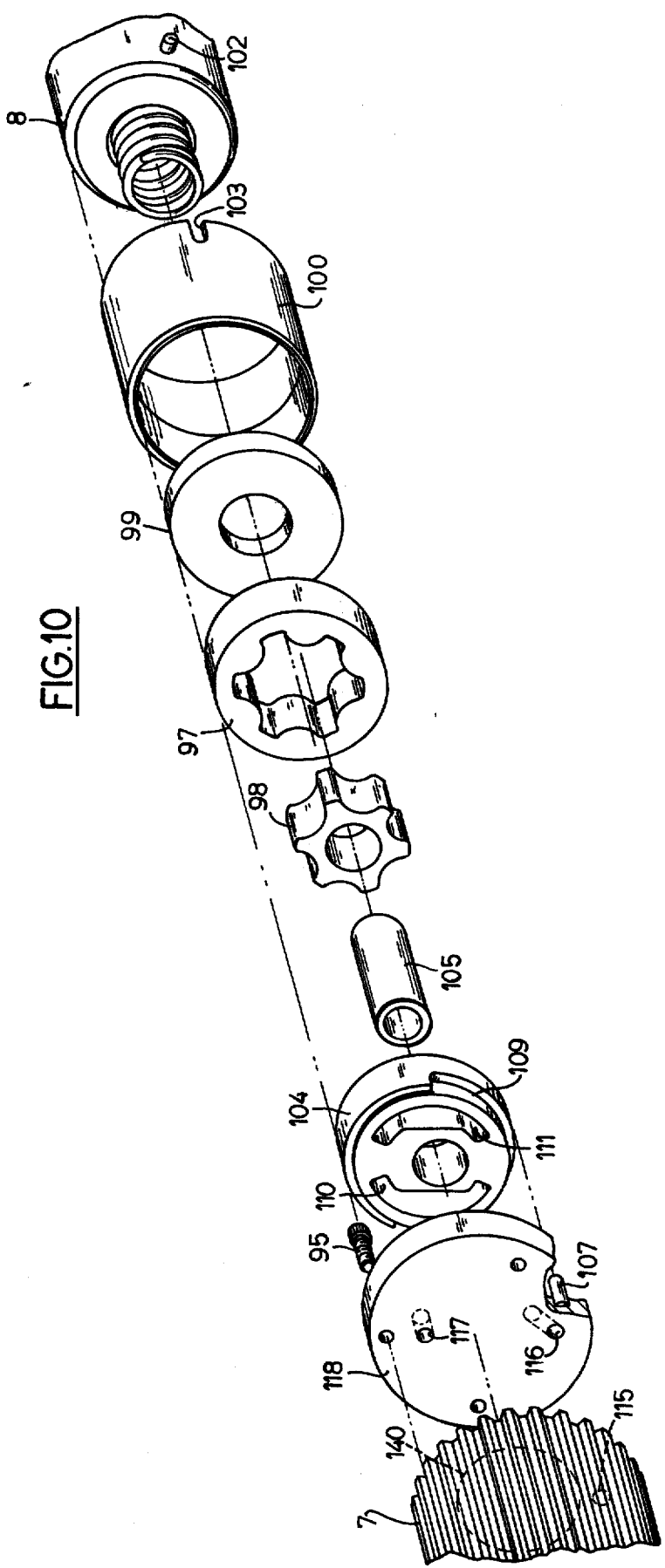
FIG. 10 is an exploded, perspective view of the differential pump which is also shown in FIGS. 6, 8 and 9.

The control system also includes an axially shiftable slip sensing valve SSV in axial alignment with valve PAV and which contains an extremely low pressure regulator consisting of a ball 124 and spring 125 that insures that the cavity 126 located between the valve SSV and the valve PAV is always maintained at a slight pressure. Valve SSV also has its right hand end (as viewed in the drawings) vented to the left hand end by means of orifice 127 and passage means 128 so that the flexible plug 122 in valve PAV can seal this vent when the valve is in the position as shown in FIG. 9.

NORMAL OPERATION—FIG. 6

In normal operation, as shown in FIG. 6, approximately 10 pounds per square inch of fluid pressure are directed to the system. This pressure is insufficient to shift valve PAV to the right (as viewed in the drawings) against the force of spring 130 and therefore fluid pressure is prevented from entering the radial passage means 132 which leads to the piston apply chamber 33. Pressure fluid however can pass through the center of valve PAV, that is, through orifice 120 in passage 121, and thereby pressurize all of the passages located to the right (as viewed in the drawings) including the pump inlet. The flow of fluid under this condition is indicated by the arrow in FIG. 6.

CLUTCH SLIPPING—DIFFERENTIAL LOCKED—FIG. 8

Figure 8:
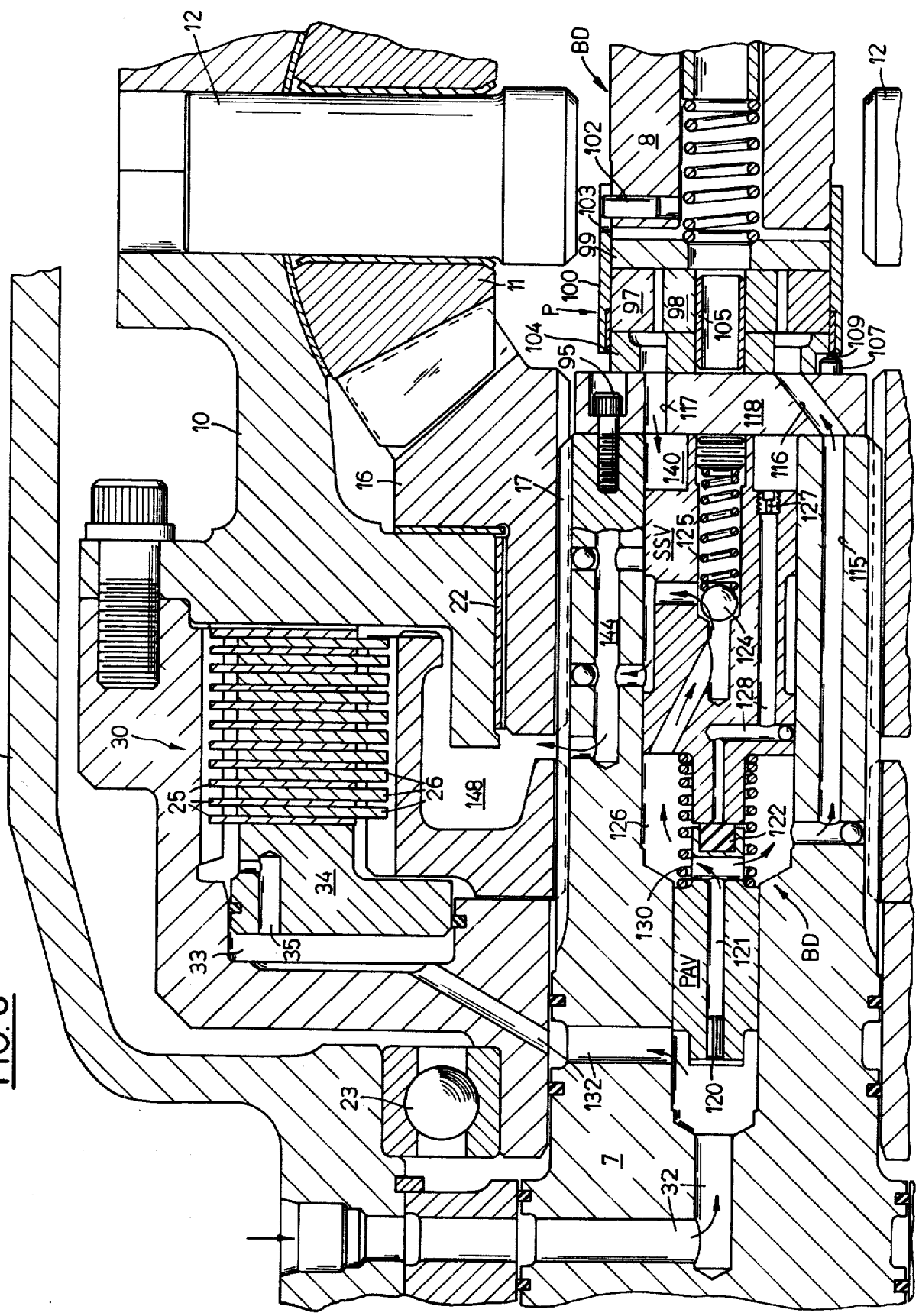
FIG. 8 is a cross-sectional view of a portion of the differential shown in FIG. 3, but on an enlarged scale and furthermore showing the system in the condition where clutch apply fluid pressure is being directed to bias the clutch, but the clutch is not slipping.

When slip of the ground wheels of the truck T occurs, the operator stops the truck and directs, for example, 150 pounds per square inch of fluid pressure to the system. This condition is shown in FIG. 8. The value of the pressure fluid is sufficient under these circumstances to shift valve PAV to the right (as viewed in the drawings) and against the spring force of spring 130 and thereby permits fluid pressure to be admitted to the piston apply cavity 33. The piston then clamps up or engages the clutch and locks the differential assembly so that both the front and rear output shafts 7 and 8 rotate together. Under these circumstances, the flexible plug 122 in the right hand end of valve PAV acts to seal the vent passage 128 from the right end to the left end of valve SSV. Because both output shafts are now rotating together, the pump P is not pumping and the clutch 30 is not slipping.

With a positively locked differential as indicated above, it is possible to direct 100 per cent of the available driving torque to one axle. Therefore, unless the drive shaft and component parts are capable of transmitting this high torque, damage will result. In this situation therefore, as will now be described, the clutch is designed to slip when a critical torque value is applied to it, as shown in FIG. 9.

SLIP CONDITION—FIG. 9

As previously mentioned in connection with FIG. 8, the flexible plug 122 seals the right side of the slip sensing valve SSV from the left side of the valve. When the friction clutch 30 slips, relative rotation occurs between the two output shafts 7 and 8. This causes the pump P to function and develop pressure at the deadheaded right hand end of valve SSV, that is, in the chamber 140. The pressure in this chamber 140 acts to shift valve SSV and consequently valve PAV to the left until valve SSV vents the right hand cavity 140 to the radial exhaust passage 144 as indicated by the arrow in FIG. 9. This movement of the valve causes valve PAV to close passage 132 to the piston apply chamber 33. Inasmuch as piston apply chamber 33 is vented by bleed passage 35, the clutch apply pressure in chamber 33 is relieved and the clutch 30 is thereby released. Thus, as a predetermined amount of torque is applied to the transmission, the clutch commences to slip and relative rotation occurs between the two output shafts 7 and 8. This brings into play the pump P which develops pressure in the cavity 140, this pressure in turn shifts valve SSV and PAV to the left (as viewed in FIG. 9) and vents chamber 140 to the atmosphere as at 148. Clutch apply pressure is also at that time cut off from piston actuating chamber 33 and the chamber 33 vents to atmosphere, thus releasing the clutch 30.

We claim:

1. A power transmission comprising, two co-axially arranged power output shafts, differential gear means between said shafts for drivingly connecting said shafts together, a hydraulically actuated friction clutch connected between said shafts for releasably connecting said shafts together through said differential gear means for driving both of said shafts; a fluid pressure pump located between said shafts and having two portions, one connected to each of said shafts and so constructed and arranged that said pump acts to pump pressure fluid when said shafts are rotating relative to one another; and fluid pressure control means communicable with the discharge of said pump when said shafts are rotating relative to one another, said pressure fluid control means comprising a pressure apply valve shiftable between positions for admitting pressure fluid to and preventing pressure fluid from actuating said friction clutch and also including a shiftable slip sensing valve movable relative to said pressure apply valve whereby when said shafts are rotating relative to one another, said pump discharges pressure fluid to shift said control valve means and consequently shut off pressure fluid from said clutch, thereby causing the latter to become disengaged.

2. The transmission set forth in claim 1 further characterized in that said shiftable slip sensing valve is shiftable by discharge pressure fluid from said pump to consequently shift said pressure apply valve to said position in which it prevents fluid pressure from actuating said friction clutch.

3. The transmission set forth in claim 2 including pressure fluid passage means in said slip sensing valve and means on said pressure apply valve for closing said passage means in said slip sensing valve when said valves abut against one another to thereby prevent said pump from shifting said valves to said position for admitting fluid pressure to actuate said clutch.

4. A vehicle having front and rear driving wheels, a power plant, a change speed gear transmission drive by said power plant and having an output which can be varied as to rotative speed and direction, and a friction clutch bias differential mechanism connecting said gear transmission output to both said front and rear wheels, said mechanism comprising: two co-axially arranged power output shafts, differential gear means between said shafts for drivingly connecting said shafts together, a hydraulically actuated friction clutch connected between said shafts for releasably connecting said shafts together through said differential gear means for driving both of said shafts; a fluid pressure pump located between said shafts and having two portions, one connected to each of said shafts and so constructed and arranged that said pump acts to pump pressure fluid when said shafts are rotating relative to one another; and fluid pressure control means communicable with the discharge of said pump when said shafts are rotating relative to one another, said pressure fluid control means comprising a pressure apply valve shiftable between positions for admitting pressure fluid to and preventing pressure fluid from actuating said friction clutch and also including a shiftable slip sensing valve movable relative to said pressure apply valve whereby when said shafts are rotating relative to one another, said pump discharges pressure fluid to shift said control valve means and consequently shut off pressure fluid from said clutch, thereby causing the latter to become disengaged; and power transmitting means for connecting said two power output shafts to their respective front and rear wheels.

* * * * *